No. 724,527. PATENTED APR. 7, 1903.
I. G. WATERMAN.
ELECTRICAL CONTROL OF THE FLOW OF WATER TO BASINS OF WASHSTANDS, &c.
APPLICATION FILED FEB. 27, 1902.
NO MODEL. 4 SHEETS—SHEET 3.
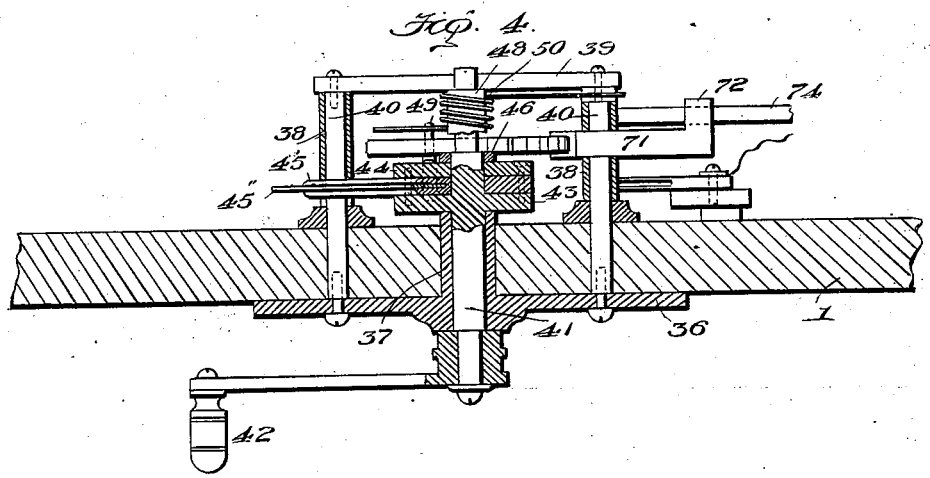
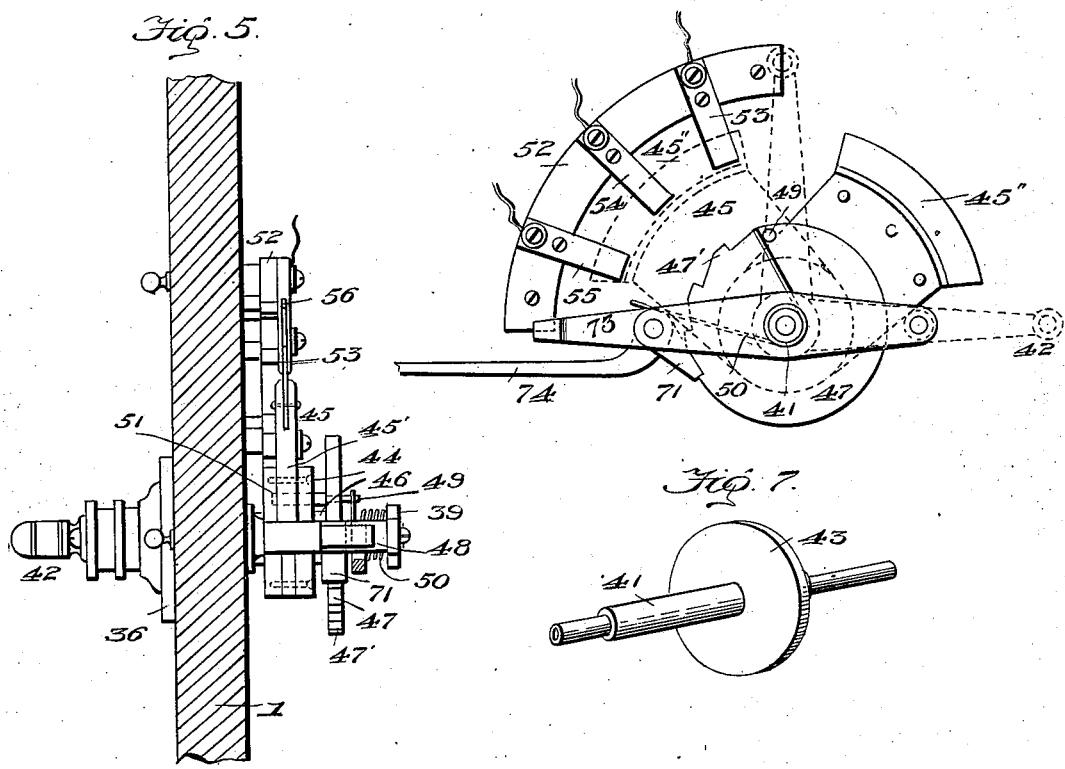
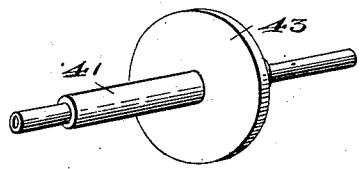
Witnesses
Inventor
Isaac G. Waterman
by Henry N. Copp
his Attorney No. 724,527. PATENTED APR. 7, 1903.
I. G. WATERMAN.
ELECTRICAL CONTROL OF THE FLOW OF WATER TO BASINS
OF WASHSTANDS, &c.
APPLICATION FILED FEB. 27, 1902.
NO MODEL. 4 SHEETS—SHEET 4.
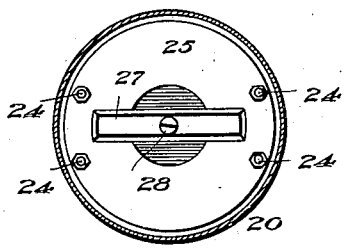
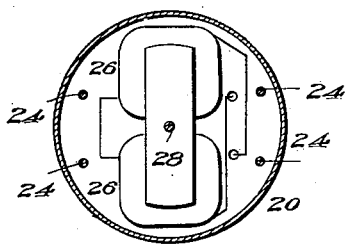
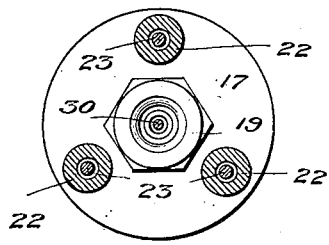
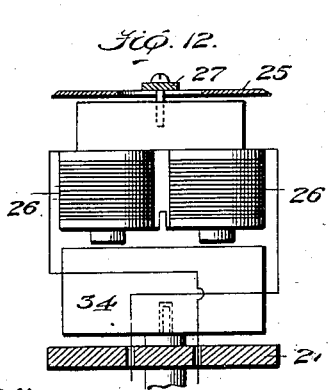
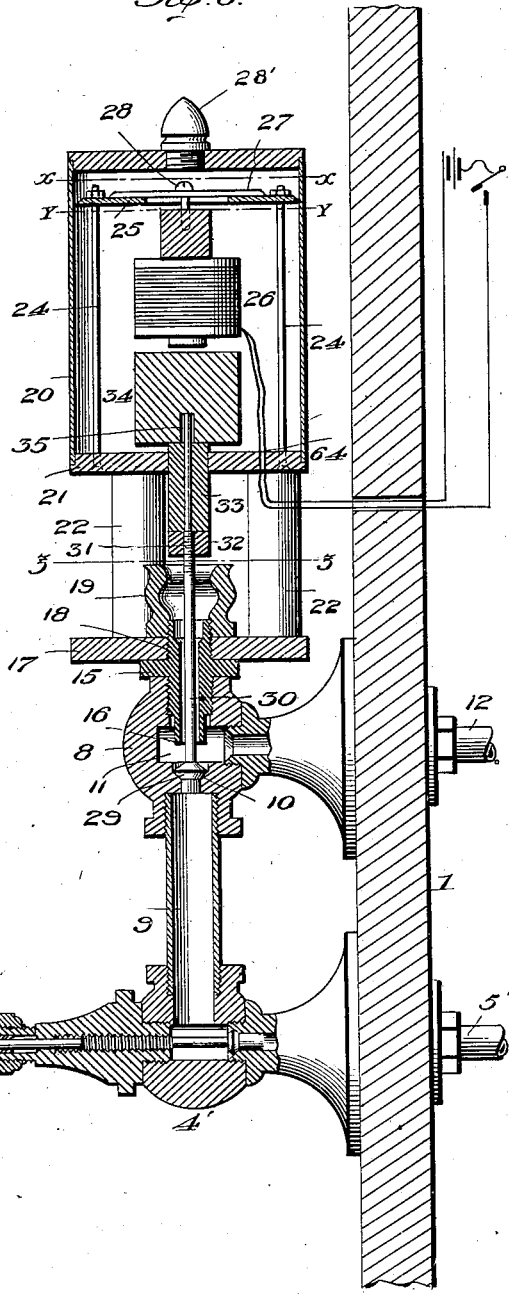
Witnesses
Inventor
Isaac G. Waterman
by Henry N. Copp
his Attorney

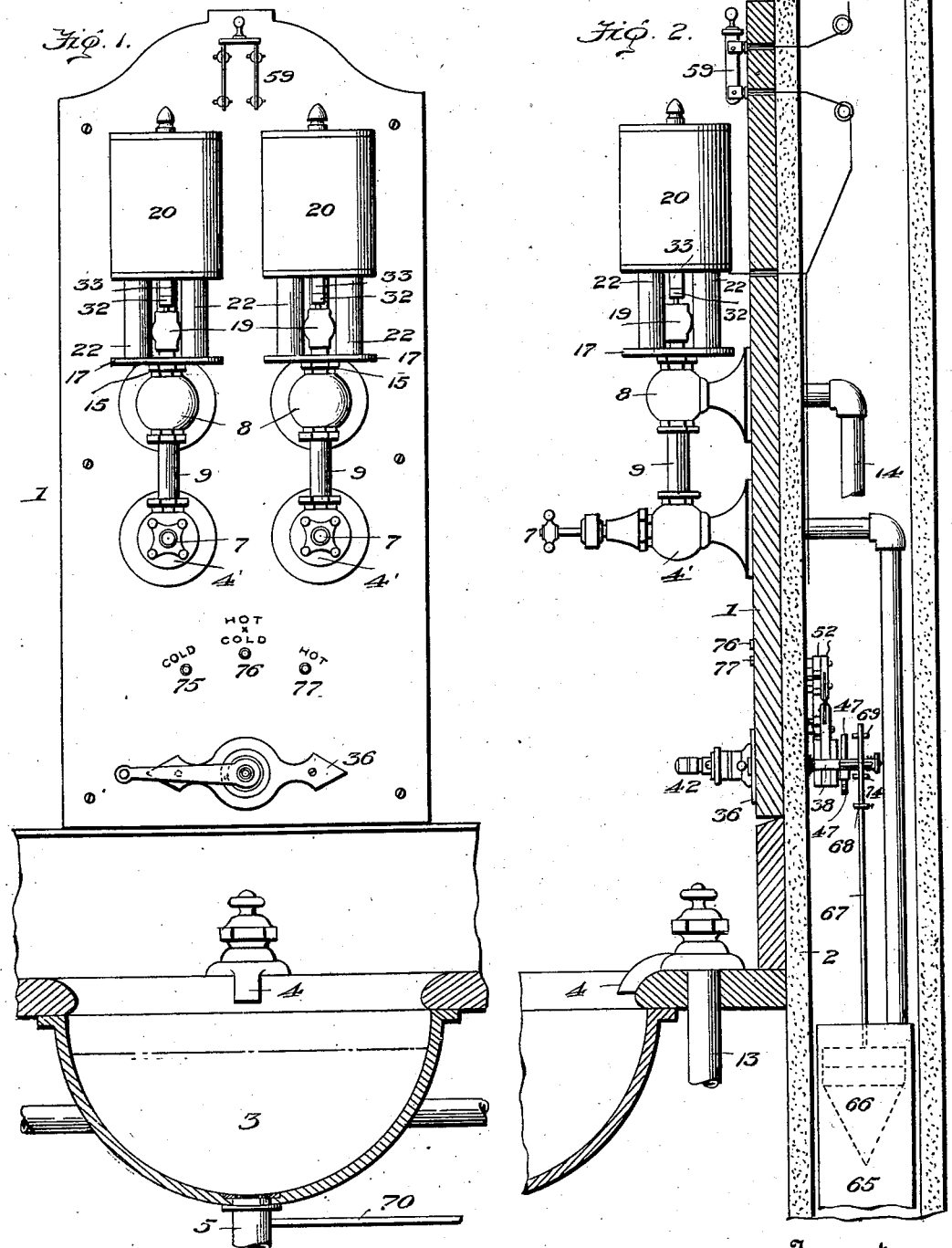

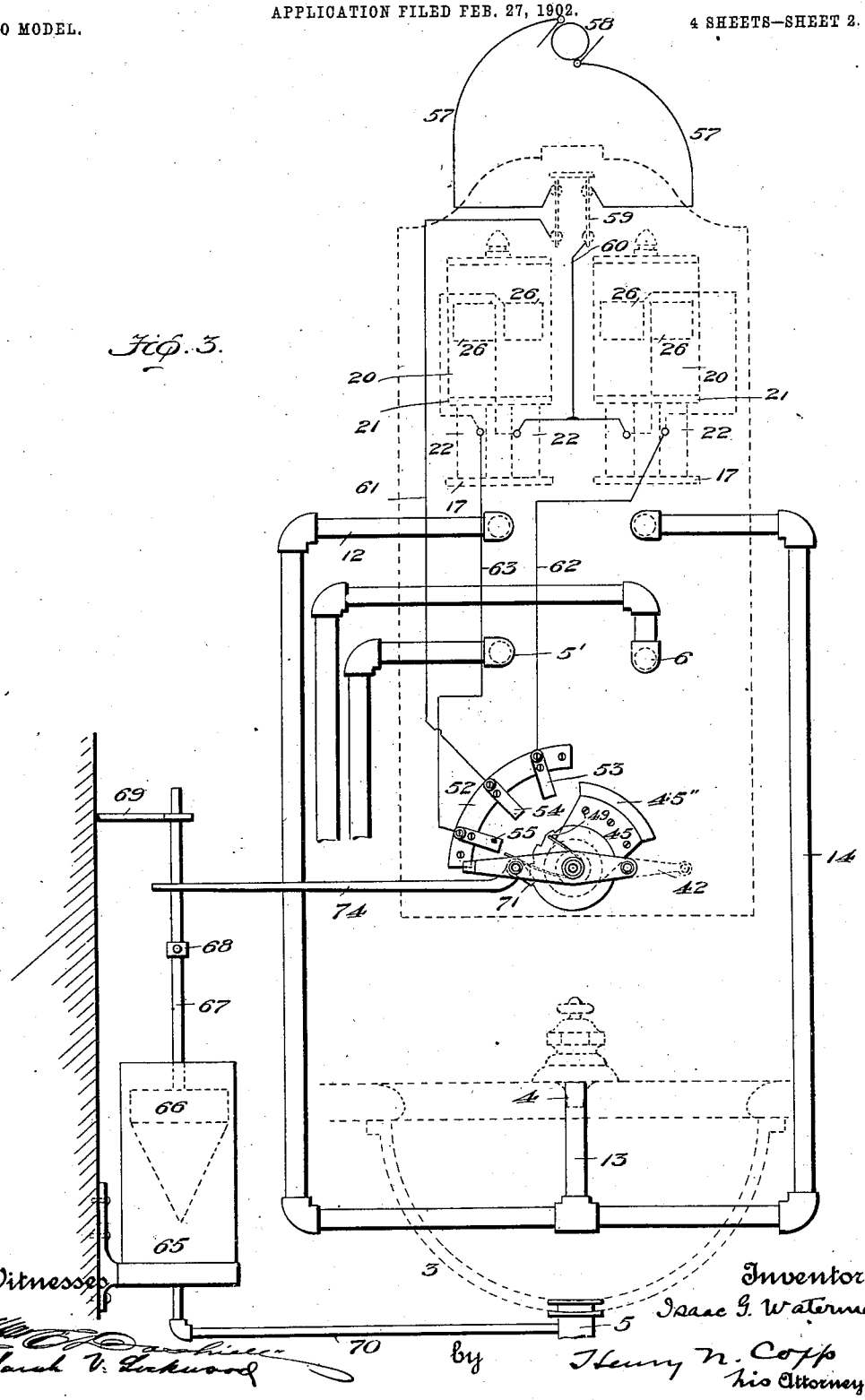

UNITED STATES PATENT OFFICE.

ISAAC G. WATERMAN, OF SANTA BARBARA, CALIFORNIA.

ELECTRICAL CONTROL OF THE FLOW OF WATER TO BASINS OF WASHSTANDS, &c.

SPECIFICATION forming part of Letters Patent No. 724,527, dated April 7, 1903.

Application filed February 27, 1902. Serial No. 95,908. (No model.)

*To all whom it may concern:*

Be it known that I, ISAAC G. WATERMAN, a citizen of the United States, residing at Santa Barbara, county of Santa Barbara, and State of California, have invented certain new and useful Improvements in Electrical Control of the Flow of Water to Basins of Washstands or Lavatory-Bowls, of which the following is a specification.
This invention relates to the electrical control of the flow of water to basins of washstands or lavatory-bowls.

The object of the invention is the provision of certain improvements on United States Letters Patent No. 682,006, granted to me September 3, 1901; and my object more particularly is to provide an improvement on the independent push-buttons employed in my former patent for controlling the flow of the water, as also to provide a novel mechanical arrangement operated from the float-tank to cut off the flow of the water, the same being used in place of the electrically-operated devices used to accomplish that purpose in my former patent.

Generally stated, the object of the present invention is the provision of an improved, simple, and durable device for electrically and automatically controlling the flow of water to the bowl or basin and for shutting off the supply when the water has reached the proper level and which can be installed without difficulty in any situation where such a device would be desirable and adapted to take its electrical current from a suitable battery or power-circuit.

The electromagnetic apparatus disclosed in the present application constitutes the subject-matter of my copending application filed February 27, 1902, Serial No. 95,909.

Having the foregoing objects and others not specifically mentioned in view, the invention consists of certain improved features and novel coacting devices and mechanisms, as fully set forth hereinafter and recited in the appended claims.

In the accompanying drawings, Figure 1 is a front view with the basin in section and the switch-handle in normal position; Fig. 2, a vertical section illustrating how the device can be applied to the wall; Fig. 3, a rear view with certain of the parts in full and other parts in dotted lines; Fig. 4, a horizontal detail section of the switch mechanism; Fig. 5, a vertical section thereof; Fig. 6, a rear view thereof; Fig. 7, a detail perspective view of certain parts of the switch mechanism; Fig. 8, an enlarged detail vertical section of one of the electromagnetic valve mechanisms and shut-off valve; Fig. 9, a view on line $x\ x$ of Fig. 8; Fig. 10, a view on line $y\ y$ of Fig. 8; Fig. 11, a view on line $z\ z$ of Fig. 8, and Fig. 12 a detail view taken in front of the magnet and armature.

The apparatus is in the main supported by a suitable slab or base 1, secured to the wall 2 in any preferred manner.

The basin or bowl 3 is of any preferred form and is located below the base 1 and provided with the spout 4 and waste or outlet 5, which will be described more in detail hereinafter, two electromagnetic valve-controlling devices and shut-off valves being employed, one for hot water and the other for cold water, and being of the same construction and arrangement only one will be described. The casing or shell of the shut-off valve is shown at 4', being suitably secured to the base 1 and fed by a supply-pipe 5', which in this instance may be the cold-water-supply pipe. The supply-pipe 6 for the other shut-off valve will be the hot-water pipe. The shut-off valve may be of any preferred construction and provided with a stem and handle 7. This valve is used to entirely shut off the supply of water whenever this may be desirable; but both of the shut-off valves are normally left wide open and the control of the flow to the basin governed by the electromagnetic mechanisms, one of which is employed in connection with the cold-water supply and the other with the hot-water supply.

The casing for the electrically-controlled valve is shown at 8 and is in communication with valve-casing 4' of the shut-off valve by a short vertical pipe 9. The valve-seat is shown at 10, above which is the valve-chamber 11, which is in communication with a pipe 12, which, as shown in Fig. 3, leads to a single pipe 13, which empties through the spout 4. From the valve-chamber of the other electromagnetically-controlled valve extends a pipe 14, which also leads to the pipe 13. Provision is thereby made for the supply of both hot and cold water to the spout 4, either singly or simultaneously.

Threaded into the top of the valve casing or shell 8 is a coupling 15, having the depending portion 16 extending into the chamber 11, against which the valve abuts when raised to prevent the escape of water through said coupling and to insure its passing out through the discharge-pipe leading to the spout. This coupling is surmounted by a circular base 17, which is threaded onto the part 18 of the coupling and the base held in position by the nut 19. Above the base 17 is the hollow cylindrical casing 20 for the electromagnetic apparatus, this casing having a head 21, which rests on short pillars 22, through which extend tie-rods 23. From the head 21 arise within the casing 20 four rods 24, which support an annulus 25.

The numeral 26 designates a bipolar electromagnet, which is adjustably suspended from a plate 27, extending diametrically of and resting on the annulus 25, through the medium of the adjusting-screw 28, which can be conveniently reached by removing the ornamental nut 28'. Provision is thereby made for vertical and circular adjustment of the electromagnet, as found desirable.

The numeral 29 designates a valve adapted to rest on seat 10 and to close the opening through a portion 16 when raised, as heretofore explained, the stem of the valve being shown at 30 and rising loosely through the coupling 15 and nut 19 and having a screw-threaded portion 31, on which is a nut 32, above which is a sleeve 33, surrounding the stem and resting on the nut, and the armature 34 for the electromagnets rests upon the upper end of the sleeve 33 and is provided with a pocket 35, which receives the protruding open end of the valve-stem. This armature is made in the form of a relatively heavy block and of sufficient weight to keep the valve 29 normally on seat 10 against the full pressure of the water entering through the supply-pipe and standing in the pipe 9 to accomplish the seating by gravitation of the parts of said valve after the deënergization of the electromagnet. It will be seen, therefore, that in the present construction the energization of the magnet attracts the armature and allows the valve, valve-stem, nut, and sleeve to be raised by the pressure of the water, while immediately upon the deënergization of the magnet the valve will become reseated by the weight of the armature and movable parts. In consequence the weight of the valve, valve-stem, sleeve, and nut is not suspended from the armature, and the magnetic attraction is only to raise the armature itself. Furthermore, by adjusting the nut 32 the sleeve and armature can be raised or lowered, as desired, and adjustment can also be had through the medium of the screw 28, so that the normal space of separation between the poles of the magnet and the armature can be made as great or as small as desired.

At some suitable position on the base 1 I provide my improved switch, whose construction is most clearly shown in Figs. 3, 4, 5, 6, and 7. The stationary framework of the switch consists of an ornamental face-plate 36, secured to the front of the base 1 and provided with the hub 37, the posts 38, the cross-piece 39, bridging the posts, and the rods 40, extending through the posts and connecting the cross-piece 39 with the face-plate 36.

The numeral 41 designates the shaft or axle of the switch, which extends through the face-plate and hub 37 and is journaled in the cross-piece 39, the same being provided with a suitable handle 42 and having a flange 43. Located on the shaft and held between the flange 43 and a clamping-plate 44 is the switch-blade 45, which has its bottom portion 45' appreciably thicker than its contact edge 45''. Loose on the axle or shaft 41 and separated from the clamping-plate 44 by a collar 46 is a disk or wheel 47, having ratchet-teeth 47'. A collar 48 separates this wheel or disk from the cross-piece 39. The disk 47 is provided with a pin 49, while 50 is a spring coiled around the collar 48 and bearing against the pin, which has a tendency to retract the disk or wheel 47. The pin 49 is extended out sufficiently far to contact with the switch-blade 45.

The numeral 52 designates an arc-shaped plate on which is mounted, but insulated therefrom, the contact or switch points 53, 54, and 55, having slots 56 and arranged in the arc of a circle and in the path of the contact portion 45' of the switch-blade, which is adapted to pass in the slotted portions 56 and make contact with the switch-points. It will be observed that the width of the switch-blade is such that it can electrically bridge all of the contact or switch points at one time.

The circuits are as follows: The circuit 57, coming from any suitable electrical generator or battery 58, first passes through a knife-switch 59 of ordinary construction, which is used for throwing in and out of circuit the entire apparatus. From this switch one branch of the circuit, 60, leads directly to both electromagnets, while the other branch, 61, leads to the switch-point 54. The remaining circuit-wires 62 and 63 from the magnets lead to the contact or switch points 53 and 55, respectively. In carrying the wires out through the ends 21 of the magnet-cases this is done by passing them through an aperture 64, Fig. 8.

As in my former patent, I employ a float-tank 65, located at a proper height relative to the basin and in which is the float 66, having float-rod 67, provided with an adjustable trip 68 and passing through a suitable guide 69. The bottom of the float-tank is connected to the waste or outlet 5 by pipe 70. The construction of the waste or outlet 5 is such that while the basin is filling from the spout 4 the water will flow through pipe 70 and rise in the float-tank the same as in the basin; but when the outlet or waste 5 is opened all the water will drain from both basin and float-tank.

Pivoted on the standard 38 is a pawl 71, having a lateral finger 72 and which is adapted to engage with any of the teeth of the ratchet wheel or disk 47 and is held adapted for normal engagement therewith by the gravitation of the longer arm 73 of the pawl.

The numeral 74 designates a releasing-rod which is pivoted on the standard 38 and has its free end adapted to be engaged and lifted by the trip 68 when the water in the float-tank reaches a predetermined height. This releasing-rod extends under the finger 72 and is adapted to engage with the finger and release the pawl from engagement with the ratchet-wheel 47 when said releasing-rod is lifted a proper distance by the trip 68.

On the front of the slab or base 1 are buttons 75, 76, and 77, representing the points to which the handle 42 must be thrown to obtain "cold," "hot and cold," and "hot" water, respectively. The handle 42 is normally held in the horizontal position (indicated in Fig. 1) by the action of the spring 50 through the ratchet-wheel 47 and pin 49, and the parts are in the position indicated in full lines in Figs. 3 and 6. If it is desired to obtain cold water in the basin, the handle 42 is turned until it is opposite the point 75, whereupon the switch-blade 45 bridges the switch-points 53 and 54, assuming that the switch 59 is closed, and a current will then flow through the electromagnet controlling the supply of water through the cold-water pipe, thus attracting the armature 34, whereupon the pressure of the water flowing through the cold-water pipe and into the pipe 9 will unseat the valve 10 and force it against the member 16, allowing cold water to flow into the spout 4 and into the basin. Similarly, if it is desired to obtain hot water the handle is rapidly turned to the point 77, whereupon the switch-blade after first passing through the switch-point 53 will bridge the switch-points 54 and 55, and a current of electricity will flow through the electromagnet controlling the hot-water supply and hot water will be permitted to flow from the hot-water pipe and through the spout into the basin. If both hot and cold water are desired, the handle will be turned to the point 76, which will cause the switch-blade to bridge the points 53, 54, and 55, as indicated in Fig. 6, and the current will then split and flow through both electromagnets, opening both valves and permitting both hot and cold water to flow simultaneously. During any of these three operations immediately that the handle has been turned a sufficient distance the pawl 71 will engage with a suitable tooth 47' on the ratchet-wheel 47, thereby locking the switch mechanism against immediate return by the spring 50.

In consequence the water will flow until the float 66 rises a sufficient distance to cause the trip 68 to engage and raise the releasing lever or rod 74 to such an extent that it will lift the pawl 71 by raising the finger 72 and cause the disengagement of the pawl from the tooth of the ratchet-wheel with which it is engaged, whereupon the spring 50 will immediately throw the ratchet-wheel, switch-blade, and handle back to normal position, with the handle appearing as in Fig. 1. Should it be desired to let in more water while the basin was thus full, this could only be done with intent by holding the handle, for the pawl could not engage the ratchet-wheel, and as soon as the handle had been released it would turn back automatically to initial position. On opening the waste or outlet 5 the water from both the basin and the float-tank will drain off, whereupon the releasing-rod 74 will drop, thereby allowing the pawl to fall, so that it will be in position for engagement with the teeth on the ratchet-wheel.

I am aware that changes of construction and adaptation of parts could be resorted to in carrying out my invention without detracting from any of its advantages or essentially altering its form or operation, and I do not, therefore, limit myself to the precise constructions and arrangements herein shown and described, but consider myself entitled to all forms and modifications falling within the spirit and scope of the invention.

Having thus described my invention, what I claim as new, and desire to secure by Letters Patent, is—

1. In a device of the class described, the combination with a fluid-receptacle, of a pipe adapted to supply said receptacle, a self-closing electromagnetically-opened valve governing the supply through said pipe, an electric switch controlling the supply of current to the electromagnetic apparatus, and means operated by the rise of the water in the receptacle adapted to automatically open the switch when the water reaches a predetermined height, thereby causing cessation of the electric current, whereby the valve will thereupon automatically close on the cessation of the electric current and the supply of fluid be cut off.

2. In a device of the class described, the combination with a fluid-receptacle, of a pipe adapted to supply said receptacle, a self-closing electromagnetically-opened valve governing the supply through said pipe, an electric switch controlling the supply of current to the electromagnetic apparatus, and a mechanical mechanism adapted to accomplish the opening of the switch when the water in the receptacle reaches a predetermined height and which is operated by the rise of the water, whereby on the opening of the switch causing cessation of the electric current the valve is allowed to close itself and the supply of water to the receptacle cut off.

3. In a device of the class described, the combination with a fluid-receptacle, of a pipe adapted to supply said receptacle, a self-closing electromagnetically-opened valve governing the supply through said pipe, an electric switch controlling the supply of current to the electromagnetic apparatus, a float adapted to rise with the water, a rod connected to the float and moving therewith, a tripping device on the rod, and a releasing rod or lever adapted to be engaged by the tripping device and which accomplishes the opening of the switch causing cessation of the electric current, whereby the valve is allowed to close itself and the supply of water to the receptacle cut off.

4. In a device of the class described, the combination with a fluid-receptacle, of hot and cold water pipes adapted to deliver water into said receptacle, automatically self-closing valves for the hot and cold water pipes, independent electromagnetic apparatuses for opening the respective valves, a circuit for each electromagnet, said circuits having a common branch, switch points or contacts for the branch and for the magnet-circuits, and a switch-blade adapted to close the circuit through any of said switch-points or all of them at once, whereby either or both of the valves may be opened to permit the flow of the water to the receptacle.

5. In a device of the class described, the combination with a fluid-receptacle, of hot and cold water pipes adapted to deliver water into said receptacle, automatically self-closing valves for the hot and cold water pipes, independent electromagnetic apparatuses for opening the respective valves, a circuit for each electromagnet, said circuits having a common branch, switch points or contacts for the branch and for the magnet-circuits, a switch-blade adapted to close the circuit through any of said switch-points or all of them at once, whereby either or both of the valves may be opened to permit the flow of the water to the receptacle, a float adapted to rise with the water, and means actuated by the float to accomplish the throwing or opening of the switch and consequent deënergization of the electromagnets, whereby the valve or valves will thereupon close.

6. In a device of the class described, the combination with a fluid-receptacle, a pipe adapted to supply said receptacle, a valve adapted to control the supply through the pipe, an electromagnetic apparatus controlling the valve, an automatically-opening switch controlling the circuit through said electromagnetic apparatus, and means actuated by the action of the water to a predetermined height adapted to release said switch and permit it to automatically open.

7. In a device of the class described, the combination with a fluid-receptacle, a pipe adapted to supply said receptacle, a valve adapted to control the supply through the pipe, an electromagnetic apparatus controlling the valve, an automatically-opening switch controlling the circuit through said electromagnetic apparatus, a pawl adapted to hold the switch where turned, a releasing lever or rod adapted to disengage the pawl from the switch, and a float actuated by the rise of the water and adapted to engage the releasing-rod at a predetermined time and disengage the pawl from the switch, whereby the switch will be enabled to automatically open itself.

8. In a device of the class described, the combination with a fluid-receptacle, of a pipe adapted to supply said receptacle, a valve adapted to control the supply through the pipe, an electromagnetic apparatus controlling the valve, a switch comprising contacts for controlling the circuit of the electromagnetic apparatus, a movable switch-blade adapted to engage said contacts, a disk or wheel having ratchet-teeth and movable with the switch-blade, a spring adapted to actuate the disk and switch-blade to hold the switch-blade normally open, a pawl adapted to engage the teeth on the wheel or disk and hold the switch-blade in contact with the switch-point, and means for disengaging the pawl from the teeth aforesaid to permit the spring to automatically open the switch-blade.

9. In a device of the class described, the combination with a fluid-receptacle, of a pipe adapted to supply said receptacle, a valve adapted to control the supply through the pipe, an electromagnetic apparatus controlling the valve, a switch comprising a movable switch-blade adapted to engage said contact-point, a disk wheel having ratchet-teeth and movable with the switch-blade, a spring adapted to actuate the disk and switch-blade to hold the switch-blade normally open, a gravitating pawl normally in contact with the wheel or disk and adapted to engage the teeth thereof when the switch-blade is turned to make contact with the switch-point and thereby hold the switch-blade, and a pivoted releasing-rod adapted for operation to disengage the pawl from the teeth of the wheel or disk.

10. In a device of the class described, the combination with a fluid-receptacle, of a pipe adapted to supply said receptacle, a valve adapted to control the supply through the pipe, an electromagnetic apparatus controlling the valve, a switch comprising split switch-points, arranged in the arc of a circle, a frame, an axle journaled in the frame, a handle for the axle, a switch-blade secured to the axle and provided with a narrow contact edge which is adapted to slide into the split switch-points, a wheel or disk provided with ratchet-teeth and located on the axle and movable with the switch-blade, a spring coiled around the axle and having one portion bearing against the ratchet wheel or disk and its other portion anchored and adapted to automatically accomplish the opening or releasing of the switch-blade from the switch-points, a gravitating pawl on the frame and adapted to engage the teeth on the wheel or disk to hold the switch-blade in contact with the switch-points, and a releasing device to disengage the pawl from said teeth.

In testimony whereof I hereunto affix my signature in presence of two witnesses.

ISAAC G. WATERMAN.

Witnesses:
 HENLEY C. BOOTH,
 ALFRED C. HALL.